(No Model.)
J. SHOEMAKER.
EVAPORATING PAN.
No. 272,784. Patented Feb. 20, 1883.
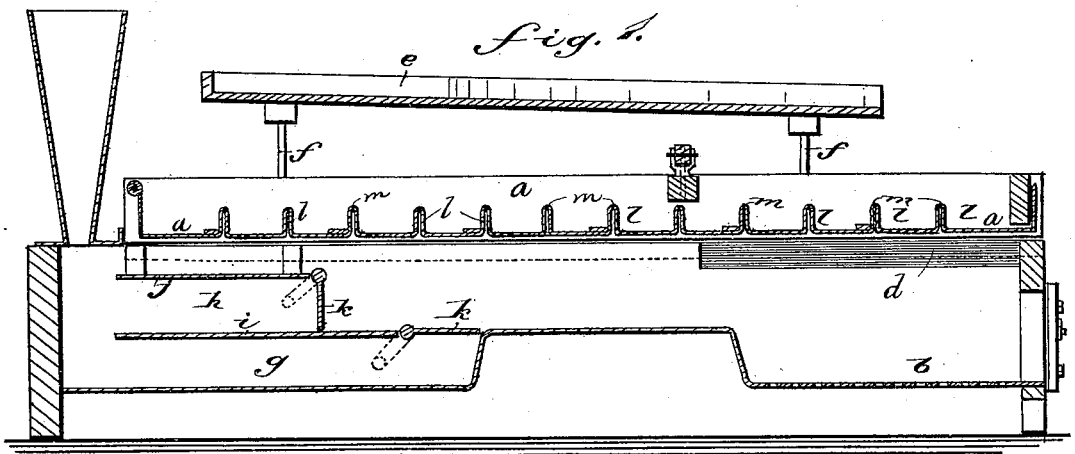
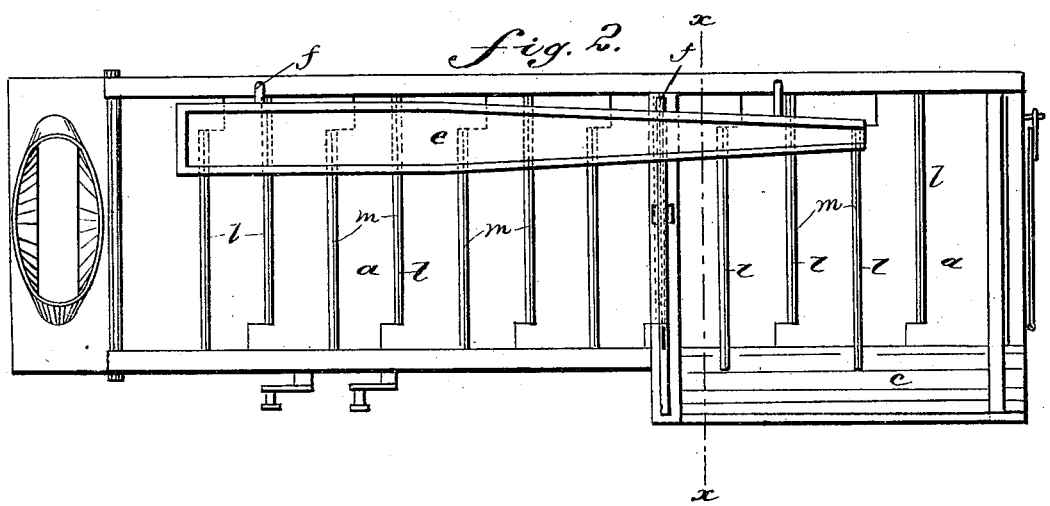
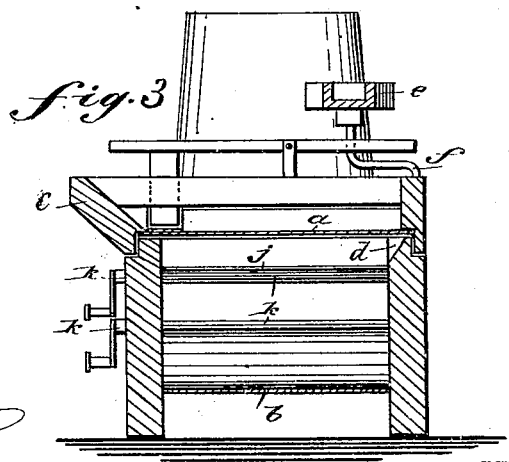
WITNESSES:
INVENTOR:
J. Shoemaker
BY
ATTORNEYS.

UNITED STATES PATENT OFFICE.

JACOB SHOEMAKER, OF LA CROSSE, WISCONSIN, ASSIGNOR OF ONE-HALF TO FREDERIC THORNELY AND BENEDICT OTT, OF SAME PLACE.

EVAPORATING-PAN.

SPECIFICATION forming part of Letters Patent No. 272,784, dated February 20, 1883.

Application filed August 9, 1882. (No model.)

*To all whom it may concern:*

Be it known that I, JACOB SHOEMAKER, of La Crosse, in the county of La Crosse and State of Wisconsin, have invented a new and Improved Evaporating-Pan, of which the following is a full, clear, and exact description.

My invention relates to evaporating-pans for saccharine juices; and it consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a longitudinal sectional elevation of my improved evaporating-pan. Fig. 2 is a plan view, and Fig. 3 is a transverse section on line $x$ $x$ of Fig. 2.

Along one side of the end of the pan $a$, that is located over the furnace $b$, where the green juice is poured in, and also where the effect of the heat is greatest to throw up the scum, I arrange a sloping side, $c$, to enable the scum to be removed by scraping it up over the slope into the trough (not shown) for receiving it, whereby the scum may be removed much better, both as to a saving of labor and because it does not break up into fine particles and fall back into the juice, as when it is gathered up in a skimmer and lifted out; and in order to cause the current of the boiling juice to set toward said slope to project the scum thereto, I slope the inner side of the opposite furnace-wall outward, as at $d$, to enable the heat to reach the extreme of that side of the pan in greater degree than the other side, to cause greater heat on that side and less on the side having the slope, which has that effect.

From over that section of the pan from which the scum may be removed by the slope I arrange a trough, $e$, along over the rest of the pan, into which the smaller quantity of scum removed from the pan $a$ under it may be poured from the skimmer, to flow back to the hotter portion and be removed with the rest of the scum over the slope; and I arrange this pan $e$ on the cranked supporting-rods $f$, which are pivoted to it and to the pan $a$, so as to swing from over the pan $a$ when not required for use and back again when wanted.

To regulate the heat under the upper portion of the pan $a$, where the finishing process goes on, and prevent the burning of the sirup, I have two flues, $g$ and $h$, cut off or separated from the pan by the partitions $i$ and $j$, respectively, each having a valve, $k$, for turning the hot gases, as desired—say into the lower flue, $g$, when the heat is greatly in excess, and into the other when not so excessive. The short or top flue is intended to be kept closed when running, so as to keep the fire from the pan, allowing no heat to strike the pan, excepting what passes through the flue-plate, thus avoiding the danger of burning or caramelizing the sugar. The long flue is used in connection with the short one to assist, and for substantially the same purpose.

Heretofore it has been the custom either to join the edges of the plates forming the bottom of the pan along the level between the ledges $l$, or to form the pan of a series of small pans united together by bolts and nuts or wedges. The uniting of the plates between the ledges is very objectionable. On account of being subjected to the direct action of the heat the solder is liable to be melted thereby and the pan caused to leak. When a series of pans are united by bolts it is very expensive and almost impossible to make a tight joint between them. To avoid these defects I make the joints at the top of the ledges. This is accomplished by turning up a flange on the edge of each plate and securing the upper edges together by solder, as at $m$, so that the points will not be subjected to the direct action of the heat, and are thereby protected, rendering the pan much more durable.

Having thus described my invention, what I claim as new, and desire to secure by Letters Patent, is—

1. The combination, with the pan $a$, of the inclined trough $e$ and the crank-supporting rods $f$, substantially as herein shown and described, whereby the trough is adapted to be swung from over the pan when not required, as set forth.

2. The combination, with the pan $a$ and the furnace $b$, of the flues $g$ $h$, arranged one above the other under the rear end of the pan, and of unequal length, and the valves or dampers $k$, substantially as herein shown and described.

3. An improved evaporating-pan having its bottom formed of a series of flanged plates united at their upper edges by solder, and forming ledges $l$, substantially as herein shown and described, whereby the solder of the joint is not affected by the heat, as set forth.

JACOB SHOEMAKER.

Witnesses:
JOHN A. DANIELS,
WILLIAM W. USTICK.